United States Patent
Suewaka

(10) Patent No.: US 11,772,473 B2
(45) Date of Patent: Oct. 3, 2023

(54) ELECTRIC VEHICLE

(71) Applicants: TOYOTA JIDOSHA KABUSHIKI KAISHA, Toyota (JP); SUBARU CORPORATION, Tokyo (JP)

(72) Inventor: Daisuke Suewaka, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 330 days.

(21) Appl. No.: 17/353,972

(22) Filed: Jun. 22, 2021

(65) Prior Publication Data
US 2022/0063389 A1 Mar. 3, 2022

(30) Foreign Application Priority Data
Aug. 26, 2020 (JP) ................. 2020-142652

(51) Int. Cl.
*H01M 4/02* (2006.01)
*B60K 1/04* (2019.01)
*H01M 6/50* (2006.01)

(52) U.S. Cl.
CPC ............. *B60K 1/04* (2013.01); *H01M 6/5038* (2013.01); *B60K 2001/0438* (2013.01)

(58) Field of Classification Search
CPC ...................................................... H01M 4/02
See application file for complete search history.

(56) References Cited

U.S. PATENT DOCUMENTS

2017/0305250 A1    10/2017    Hara

FOREIGN PATENT DOCUMENTS

| DE | 102019201745 | * | 8/2020 |
| JP | 2014-157756 A | | 8/2014 |
| JP | 2014-191916 A | | 10/2014 |
| JP | 2017-193290 A | | 10/2017 |
| JP | 2018-95096 A | | 6/2018 |
| JP | 2020-053148 A | | 4/2020 |

* cited by examiner

*Primary Examiner* — Jacob B Marks
(74) *Attorney, Agent, or Firm* — Oliff PLC

(57) ABSTRACT

An electric vehicle includes a power supply placed under a floor panel, a cooler placed under the power supply, a heat transfer material that is sandwiched and compressed between the power supply and the cooler, a protective board that has higher rigidity than the cooler, and is attached to a bottom of the power supply, to cover the cooler from an underside, and an elastic body that is sandwiched and compressed between the cooler and the protective board.

5 Claims, 4 Drawing Sheets

ELECTRIC VEHICLE

CROSS-REFERENCE TO RELATED APPLICATION

This application claims priority to Japanese Patent Application No. 2020-142652 filed on Aug. 26, 2020, incorporated herein by reference in its entirety.

BACKGROUND

1. Technical Field

The technology disclosed in this specification relates to an electric vehicle in which a power supply is placed under a floor panel, and furthermore, a cooler is mounted under the power supply.

2. Description of Related Art

In some electric vehicles, a power supply that supplies electric power to a motor for traveling is placed under a floor panel. Examples of such electric vehicles are disclosed in Japanese Unexamined Patent Application Publications No. 2017-193290 (JP 2017-193290 A) and No. 2014-191916 (JP 2014-191916 A). In an electric vehicle described in JP 2014-191916 A, a cooler is mounted under a power supply.

SUMMARY

A heat transfer material having high heat conductivity is sandwiched between the power supply and the cooler. To improve the conductivity of heat from the power supply to the cooler, the heat transfer material is compressed between the power supply and the cooler. The cooler needs to be strongly pressed against the power supply, so that the heat transfer material is strongly compressed. In the meantime, the cooler, which is desirably thin, is made from thin metal sheets, and thus has low rigidity. Thus, the cooler needs to be pressed against the power supply at many positions, so as to keep the whole heat transfer material in the compressed state. Fixing the cooler at many positions results in poor productivity. This specification relates to an electric vehicle in which a power supply is placed under a floor panel of a vehicle body, and furthermore, a cooler is mounted under the power supply, and provides a structure that is excellent in the productivity.

The electric vehicle disclosed in this specification includes a power supply placed under a floor panel, a cooler placed under the power supply, a heat transfer material that is sandwiched and compressed between the power supply and the cooler, a protective board that has higher rigidity than the cooler, and is attached to a bottom of the power supply, to cover the cooler from an underside, and an elastic body that is sandwiched and compressed between the cooler and the protective board. The protective board protects the power supply and the cooler against pebbles, etc. flying up from the road during traveling.

In the electric vehicle disclosed in this specification, the protective board having higher rigidity than the cooler presses the cooler against the power supply via the elastic body. Since the protective board having high rigidity presses the cooler against the power supply, it can hold the heat transfer material in a compressed state without requiring the cooler to be fixed at many positions. Namely, the electric vehicle disclosed in this specification has excellent productivity. Here, "the rigidity of the cooler", and "the rigidity of the protective board" mean the flexural or bending rigidity of the cooler and that of the protective board, respectively.

Details and further improvements of the technology disclosed in this specification will be described in "DETAILED DESCRIPTION OF EMBODIMENTS" below.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
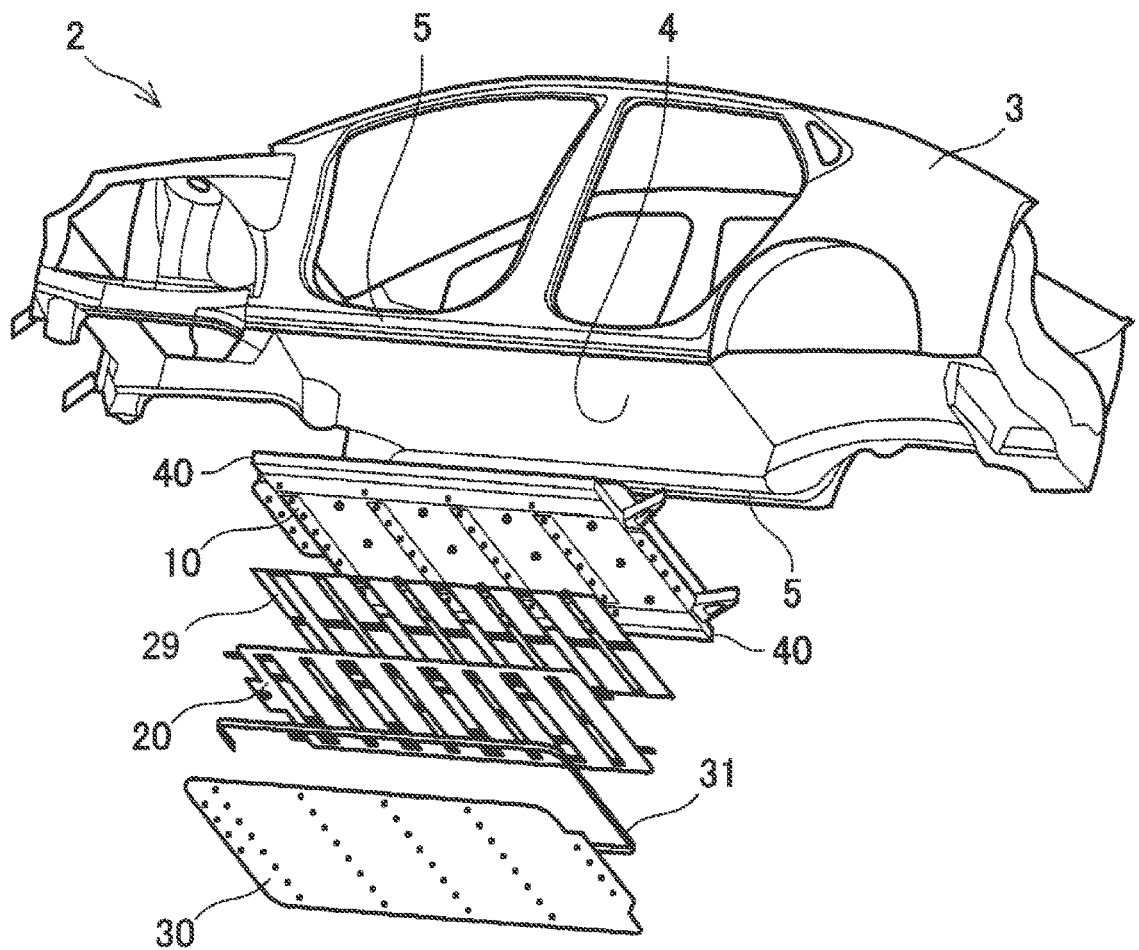
FIG. 1 is an exploded perspective view of a vehicle body of an electric automobile.

An electric vehicle of one embodiment will be described with reference to the drawings. The electric vehicle of the embodiment is an electric automobile 2. FIG. 1 is an exploded perspective view of a vehicle body 3 of the electric automobile 2.

FIG. 1 shows parts that are placed under a floor panel 4 of the vehicle body 3, in a condition where the parts are demounted from the vehicle body 3. In FIG. 1 and subsequent figures, parts incorporated in the vehicle body 3, other than the parts placed under the floor panel 4, are not illustrated. The floor panel 4 is placed between a pair of rockers 5. The floor panel 4 corresponds to a floor of a vehicle cabin. A battery pack 10, cooler 20, and protective board 30 are mounted under the floor panel 4. Energy absorbing members 40 (which will be described later) are mounted at both sides of the battery pack 10.

The battery pack 10 stores electric power to be supplied to a motor for traveling (not shown) of the electric automobile 2. The battery pack 10 is fixed to the pair of rockers 5. Since the battery pack 10 generates heat during use, a cooler 20 is placed under the battery pack 10. To improve the conductivity of heat from the battery pack 10 to the cooler 20, a heat transfer material 29 is sandwiched between the battery pack 10 and the cooler 20. The cooler 20 has channels through which a coolant flows, and the heat transfer material 29 is placed above the channels.

A protective board 30 is mounted to cover the cooler 20 from the downside, so as to protect the cooler 20 and the battery pack 10 against pebbles, etc. flying up from the road during traveling. An elastic body 31 is sandwiched between the cooler 20 and the protective board 30. The elastic body 31 is in the form of a frame, and extends along an edge of the cooler 20.

Figure 2:
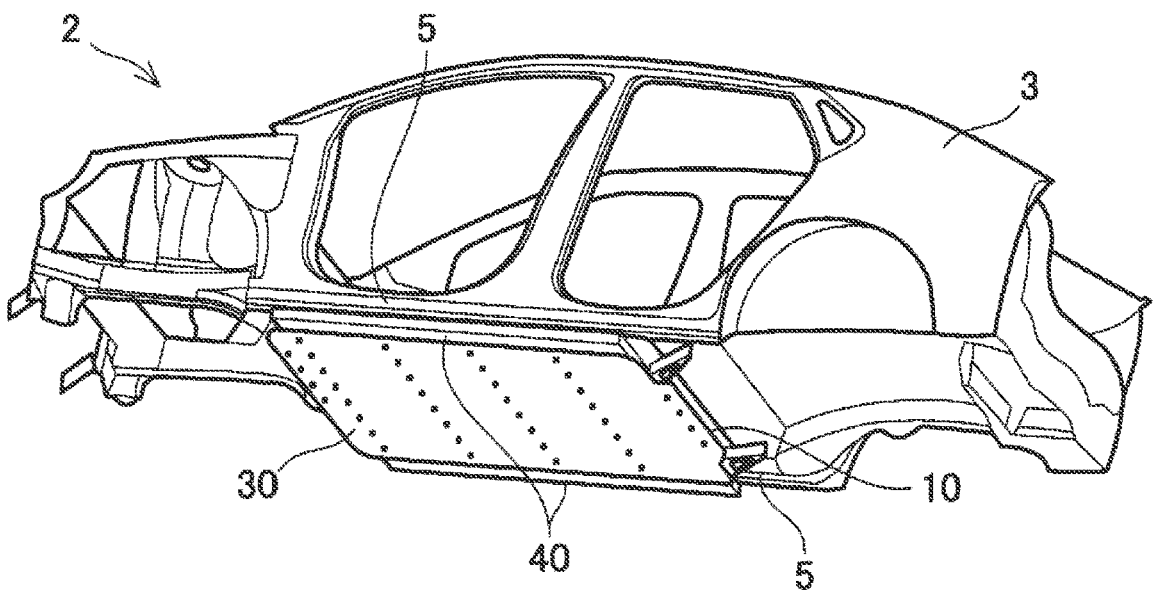
FIG. 2 is a perspective view of the vehicle body of the electric automobile.

FIG. 2 shows the vehicle body 3 to which the battery pack 10, heat transfer material 29, cooler 20, elastic body 31, and protective board 30 are mounted. The heat transfer material 29, cooler 20, and elastic body 31, which are hidden by the protective board 30, are not seen in FIG. 2. In FIG. 2, the energy absorbing members 40 attached to the sides of the battery pack 10 are seen. The energy absorbing members 40 extend in the longitudinal direction of the vehicle body 3, along the rockers 5.

The heat transfer material 29 is foamable resin, for example, and has a compressible property (elasticity). The heat transfer material 29 is sandwiched and compressed between the battery pack 10 and the cooler 20. In the meantime, the cooler 20 is made from two thin metal sheets, and has low flexural rigidity. Accordingly, in order to hold the heat transfer material 29 in a compressed state only by means of the cooler 20, the cooler 20 needs to be fixed to the battery pack 10 at many positions, which may result in poor productivity.

In the electric automobile 2 of this embodiment, the protective board 30 is utilized to hold the heat transfer material 29 in the compressed state without requiring the cooler 20 to fixed to the battery pack 10 at many positions. As described above, the protective board 30, which serves to protect the cooler 20 against pebbles, etc. flying up during traveling, has a larger thickness than the metal sheets used for the cooler 20, and has higher flexural rigidity than the cooler 20. Thus, the elastic body 31 is sandwiched between the cooler 20 and the protective board 30. The elastic body 31 is foamable resin, for example, and is sandwiched and compressed between the cooler 20 and the protective board 30. The protective board 30 having higher rigidity than the cooler 20 presses the cooler 20 against the battery pack 10 via the elastic body 31. In the electric automobile 2 of the embodiment, there is no need to fix the cooler 20 at many positions so as to hold the heat transfer material 29 in the compressed state, thus assuring excellent productivity.

Figure 3:
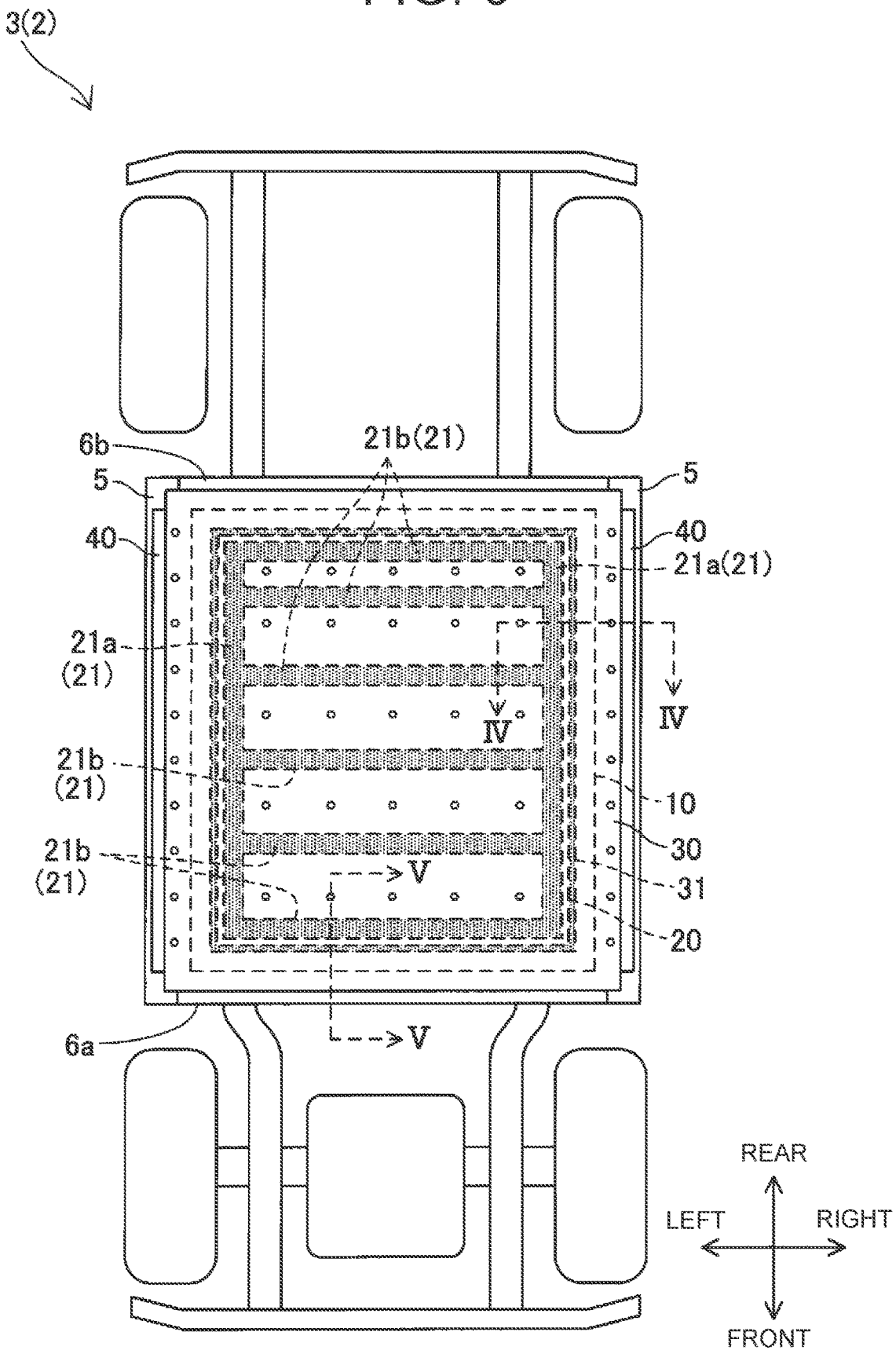
FIG. 3 is a bottom view of the vehicle body of the electric automobile.

FIG. 3 is a bottom view of the vehicle body 3 of the electric automobile 2. The direction arrows labelled with "Front" and "Rear" in FIG. 3 denote the front and the rear of the vehicle body 3, respectively. The direction arrow labelled with "Right" in FIG. 3 denotes the right direction when viewed from the rear of the vehicle body 3 to the front. In subsequent figures, too, "Front", "Rear", etc. have the same meanings.

The battery pack 10, cooler 20, and elastic body 31 are covered with the protective board 30, and are depicted with broken lines. The battery pack 10 is located between a pair of rockers 5. Also, the battery pack 10 is located between a front cross member 6a and a rear cross member 6b which connect the rockers 5.

The cooler 20 includes two longitudinal channels 21a and a multiplicity of lateral channels 21b. In FIG. 3, the longitudinal channels 21a, lateral channels 21b, and elastic body 31 are depicted in grey, for the sake of easier understanding. The multiple lateral channels 21b are connected between the two longitudinal channels 21a. The coolant is supplied to one of the longitudinal channels 21a. The coolant is distributed to the multiple lateral channels 21b, and returns to a circulation system via the other longitudinal channel 21a. In FIG. 3, a coolant inlet and a coolant outlet of the cooler 20 are not illustrated. In the following description, the longitudinal channels 21a and lateral channels 21b may be collectively called "channels 21". The heat transfer material 29 is sandwiched between each of the channels 21 and the battery pack 10. In FIG. 3, the shape of the channels 21 corresponds to the shape of the heat transfer material 29.

The elastic body 31 has a frame-like shape when the vehicle body 3 is viewed from the downside, and is positioned so as to surround the cooler 20 (the channels 21).

Figure 4:
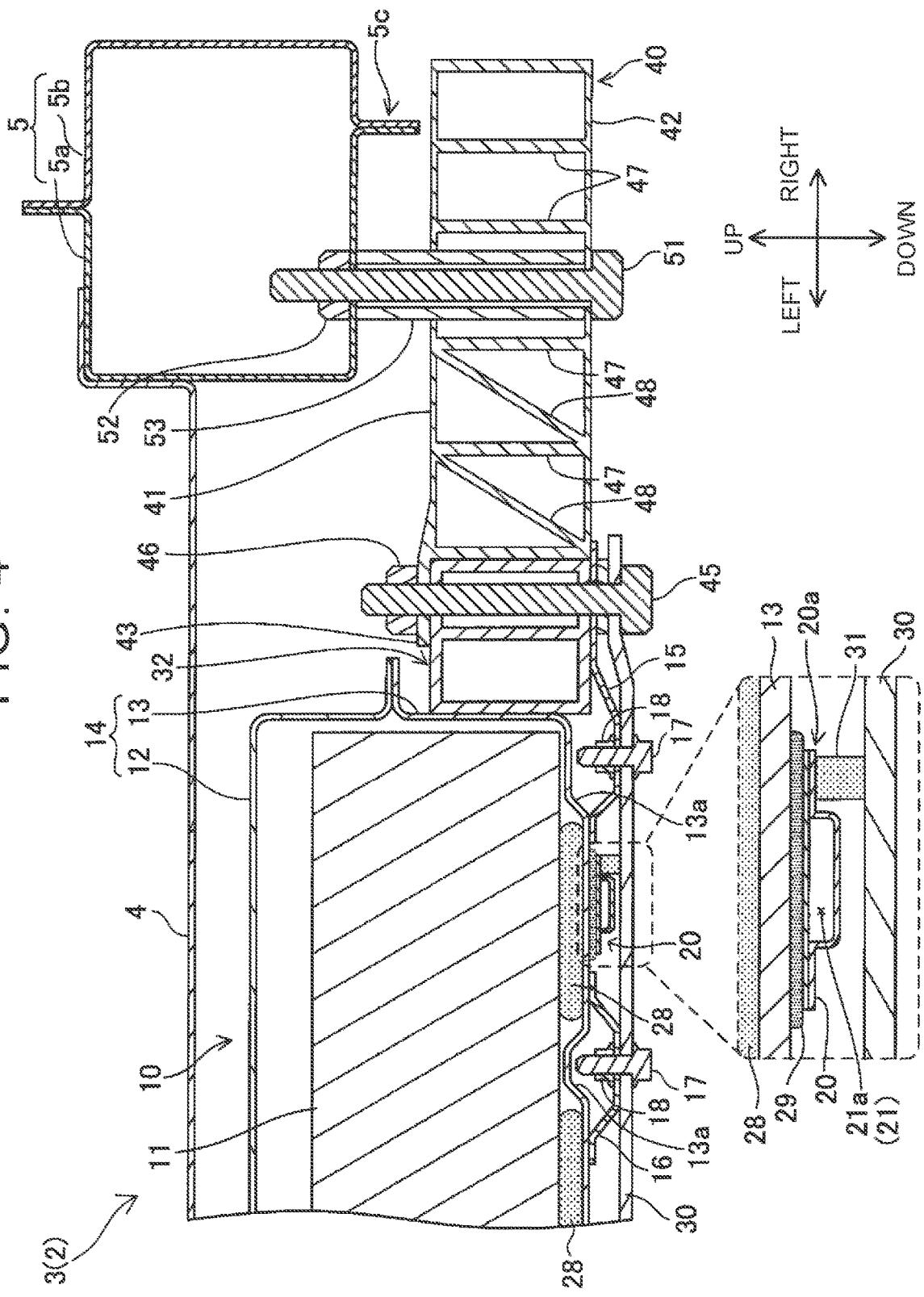
FIG. 4 is a cross-sectional view of the vehicle body taken along line IV-IV of FIG. 3.
Figure 5:
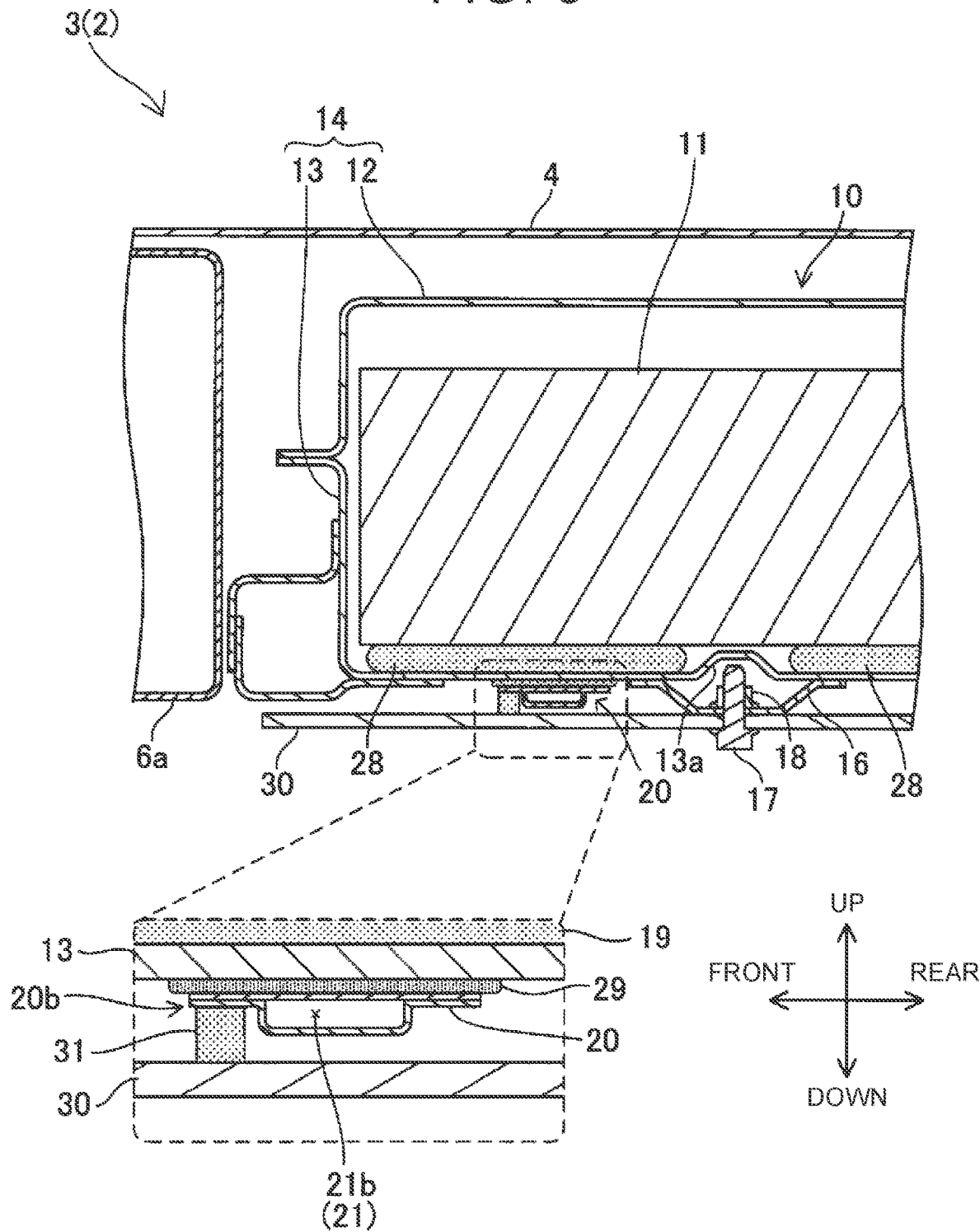
FIG. 5 is a cross-sectional view of the vehicle body taken along line V-V of FIG. 3.

Referring next to FIG. 4 and FIG. 5, the structure in the vicinity of one of the channels 21 will be described. FIG. 4 shows a cross section of the vehicle body 3 taken along line Iv-Iv of FIG. 3. The cross section of FIG. 4 shows the vicinity of the right rocker 5 of the vehicle body 3. The vicinity of the left rocker 5 of the vehicle body 3 has the same structure.

The battery pack 10 consists of a housing 14 that consists of a top plate 12 and a bottom plate 13, and a plurality of battery cells 11 housed in the housing 14. In FIG. 4 (and FIG. 5), the battery cells 11 are simplified and represented by a simple, single rectangle. The battery cells 11 are fixed to the bottom plate 13 of the housing 14 via the heat transfer material 28.

A first energy absorbing member 32 is attached to a side face of the battery pack 10, and a second energy absorbing member 40 is attached to the outer side of the first energy absorbing member 32. Each of the energy absorbing members 32, 40 is a hollow beam that extends in the longitudinal direction of the vehicle body. When an obstacle collides with one side of the vehicle body 3, the energy absorbing members 32, 40 crush and absorb energy of collision, to protect the battery pack 10. In the following description, the "energy absorbing member" will be abbreviated to "EA member", for the sake of simplicity. The battery pack 10 is supported by the rocker 5, via the first EA member 32 and the second EA member 40.

The first EA member 32 is bonded with an adhesive to one side face of the housing 14 of the battery pack 10, and is fixed to the battery pack 10 and the protective board 30 with a bolt 45 and a nut 46. A bracket 15 extends laterally from a bottom face of the housing 14, and the bracket 15 and the protective board 30 are fixed to the first EA member 32 with the bolt 45 and nut 46.

The second EA member 40 is also fixed to the first EA member 32 with the bolt 45 and nut 46. A flange 43 extends from an upper plate 41 of the second EA member 40, and the flange 43 is fixed to the first EA member 32 with the bolt 45 and nut 46. As described above, the second EA member 40 is a hollow beam, and includes reinforcement vertical plates 47 and braces 48 in the inside thereof. The reinforcement vertical plates 47 connect the upper plate 41 and a lower plate 42 of the second EA member 40.

The second EA member 40 is fixed to the rocker 5 with a bolt 51 and a nut 52. The rocker 5 is also a hollow beam that extends in the longitudinal direction of the vehicle body 3. The rocker 5 consists of a rocker inner panel 5a and a rocker outer panel 5b each having an angular U-like shape. Both of the rocker inner panel 5a and rocker outer panel 5b have flanges that are joined to each other, and form the hollow rocker 5.

A flange 5c extends downward from the bottom face of the rocker 5. A cylindrical spacer 53 is used, for fixing the second EA member 40 to the rocker 5 such that the second EA member 40 does not interfere with the flange 5c. The spacer 53 extends through the upper plate 41 of the second EA member 40, and the lower end of the spacer 53 abuts against a lower plate of the second EA member 40, while the upper end of the spacer 53 abuts against the bottom face of the rocker 5. The bolt 51 extends through the spacer 53 from the downside, to be fixed to the rocker 5 with the nut 52. The spacer 53 secures a gap between the rocker 5 and the second EA member 40, and the second EA member 40 is fixed to the rocker 5 without interfering with the flange 5c.

The floor panel 4 corresponding to the floor of the vehicle cabin is fixed to the rocker 5. The battery pack 10 is placed under the floor panel 4.

Brackets 15, 16 are attached to the bottom face of the housing 14 of the battery pack 10. Each of the brackets 15, 16 is curved so as to protrude downward. The bottom of the housing 14 is provided with recesses 13a that face protruding portions of the brackets 15, 16. The protective board 30 is fixed to the protruding portions of the brackets 15, 16. The protective board 30 is fixed to the brackets 15, 16 (namely, the battery pack 10) with bolts 17 and nuts 18. Distal ends of the bolts 17 that pass through the brackets 15, 16 are located in the recesses 13a provided at the bottom of the housing 14.

The brackets 15, 16 that are curved so as to protrude downward are employed, and the recesses 13a facing the brackets 15, 16 are provided, thus making it possible to fix the protective board 30 to the battery pack 10, without forming holes in the bottom of the housing 14. Since no hole need be formed in the bottom of the housing 14, water can be prevented from entering the inside of the housing 14.

FIG. 4 includes an enlarged view of the vicinity of one of the longitudinal channels 21a of the cooler 20. As described above, the cooler 20 is formed by attaching two metal sheets to each other, and the longitudinal channel 21a is formed between the two metal sheets. The cooler 20 is bonded to the bottom plate 13 of the battery pack 10 with the heat transfer material 29. The heat transfer material 29 has elasticity, and is sandwiched in a compressed state between the cooler 20 and the battery pack 10.

The elastic body 31 is sandwiched and compressed between the cooler 20 and the protective board 30. The protective board 30 presses the cooler 20 against the bottom face of the housing 14 of the battery pack 10 via the elastic body 31. The longitudinal channels 21a shown in FIG. 4 is the right longitudinal channel of the vehicle body 3. The protective board 30 presses the right side of the longitudinal channel 21a, namely, a right edge 20a of the cooler 20, against the bottom face of the battery pack 10, via the elastic body 31. Although not illustrated in the drawings, the protective board 30 also presses a left edge of the cooler 20 against the bottom face of the battery pack 10, via the elastic body 31.

FIG. 5 shows a cross section of the vehicle body 3 taken along line V-V of FIG. 3. FIG. 5 shows the front end of the battery pack 10 in cross section. FIG. 5 also includes an enlarged view of the vicinity of one of the lateral channels 21b of the cooler 20.

The battery pack 10 is located behind the front-side cross member (the front cross member 6a) of the vehicle body 3. The lateral channel 21b shown in FIG. 5 is located in the front row among the multiple lateral channels 21b. The protective board 30 presses the front side of the lateral channel 21b, i.e., a front edge 20b of the cooler 20, against the bottom face of the battery pack 10, via the elastic body 31. On the front side of the battery pack 10, too, the bracket 16 that is curved to protrude downward is attached to the bottom plate 13, and the protective board 30 is fixed to the bracket 16 via the bolt 17 and the nut 18. The bottom of the housing 14 is provided with the recess 13a that faces the protruding portion of the bracket 16. As in the case of FIG. 4, the distal end of the bolt 17 that passes through the bracket 16 is located in space of the recess 13a. As described above, the bracket 16 that is curved to protrude downward is employed, and the recess 13a that faces the bracket 16 is provided, thus making it possible to fix the protective board 30 to the battery pack 10, without forming a hole in the bottom of the housing 14. Although not illustrated in the drawings, the protective board 30 also presses a rear edge of the cooler 20 against the bottom face of the battery pack 10, via the elastic body 31.

As shown in FIG. 3 to FIG. 5, the elastic body 31 is positioned so as to surround the edge of the cooler 20, when the vehicle body 3 is viewed from the downside. The protective board 30 presses the edge of the cooler 20 against the battery pack 10, via the frame-shaped elastic body 31. While the cooler 20 is made of metal having low flexural rigidity, the protective board 30 having high flexural rigidity presses the cooler 20 against the bottom face of the battery pack 10, so that the heat transfer material 29 is held in the compressed state, between the cooler 20 and the battery pack 10. With the frame-shaped elastic body 31 thus provided, the heat transfer material 29 is held in the compressed state, over the entire area of the cooler 20. The electric automobile 2 of the embodiment utilizes the protective board 30 having high rigidity, for holding the heat transfer material 29 that spreads widely over the upper face of the cooler 20, in the compressed state. Thus, there is no need to fix the cooler 20 having low rigidity, at many individual positions, thus assuring high productivity in the manufacture of the electric automobile 2.

Some points to be noted in connection with the technology described in the embodiment will be described. The elastic body 31 is positioned so as to surround the cooler 20, when the vehicle body 3 is viewed from the downside. The elastic body 31 prevents water from entering space between the protective board 30 and the cooler 20. However, the frame-shaped elastic body 31 may be cut off at some points.

The heat transfer material 29 placed between the cooler 20 and the battery pack 10 may be a gel-like adhesive in the initial state. Since the protective board 30 presses the cooler 20 against the battery pack 10 in the process of manufacture of the electric automobile 2, the gel-like adhesive is held in the compressed state and cured.

The battery pack 10 of the embodiment corresponds to one example of the power supply. The power supply may be a fuel cell. Electric vehicles mentioned in this specification include a hybrid vehicle having an engine as well as an electric motor for traveling.

While some specific examples of the disclosure have been described in detail, they are merely exemplary, and are not intended to limit the scope of the disclosure defined in the appended claims. The technologies described in the claims include those obtained by modifying or changing the illustrated specific examples in various ways. Technical elements described in this specification or drawings yield technical usefulness when they are used alone or in various combinations, and are not limited to combinations described in the claims as filed. Also, the technologies illustrated in the specification or drawings can achieve two or more objects at the same time, and have technical usefulness by achieving one of the objects.

What is claimed is:

1. An electric vehicle comprising:
   a power supply placed under a floor panel;
   a cooler placed under the power supply;
   a heat transfer material that is sandwiched and compressed between the power supply and the cooler;
   a protective board that has higher rigidity than the cooler, and is attached to a bottom of the power supply, to cover the cooler from an underside; and
   an elastic body that is sandwiched and compressed between the cooler and the protective board.

2. The electric vehicle according to claim 1, wherein the elastic body has a frame-like shape, and extends along an edge of the cooler.

3. The electric vehicle according to claim 1, wherein:
   the power supply has a bottom plate to which a bracket that protrudes downward is attached; and
   the protective board is fixed to the bracket with a bolt.

4. The electric vehicle according to claim 1, wherein the elastic body is a foamable resin.

5. The electric vehicle according to claim 1, wherein the heat transfer material is a gel-like adhesive that has been cured.

* * * * *